(12) United States Patent
Nakamura

(10) Patent No.: US 8,201,948 B2
(45) Date of Patent: *Jun. 19, 2012

(54) IMAGE DISPLAY DEVICE HAVING A SCREEN WITH A FLUORESCENT REGION

(75) Inventor: Norio Nakamura, Matsumoto (JP)

(73) Assignee: Seiko Epson Coporation (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/228,750

(22) Filed: Sep. 9, 2011

(65) Prior Publication Data

US 2011/0317132 A1     Dec. 29, 2011

Related U.S. Application Data

(63) Continuation of application No. 12/186,860, filed on Aug. 6, 2008, now Pat. No. 8,033,667.

(30) Foreign Application Priority Data

Aug. 8, 2007   (JP) .................................. 2007-206212
Aug. 8, 2007   (JP) .................................. 2007-206213
May 16, 2008   (JP) .................................. 2008-129294

(51) Int. Cl.
    *G07F 17/32* (2006.01)
(52) U.S. Cl. .................. 353/40; 353/41; 353/74; 353/77
(58) Field of Classification Search .................... 353/30, 353/31, 34, 33, 37, 74, 77
    See application file for complete search history.

(56) References Cited

U.S. PATENT DOCUMENTS

2007/0183466 A1    8/2007 Son et al.
2007/0285585 A1*  12/2007 Nakamura et al. ............. 348/744

FOREIGN PATENT DOCUMENTS

| JP | 2003-287802 | 10/2003 |
| JP | 2005-025101 | 1/2005 |
| JP | 2005-331777 | 12/2005 |
| JP | 2006-154032 | 6/2006 |
| JP | 2006-284912 | 10/2006 |
| JP | 2007-213078 | 8/2007 |
| JP | 2007-218956 | 8/2007 |

* cited by examiner

*Primary Examiner* — Tony Ko
(74) *Attorney, Agent, or Firm* — Harness, Dickey & Pierce, P.L.C.

(57) ABSTRACT

An image display device having a screen having a fluorescent region including a fluorescent material; a light irradiation system, including a first light source outputting excitation light exciting the fluorescent material; a second light source outputting visible light; a scanning unit scanning with a light beam output from each of the first light source and the second light source on the screen; and an excitation light wavelength band reflector reflecting light in a wavelength band of the excitation light toward the screen, and formed on an output side of a light beam from the light irradiation system with respect to the screen. The visible light output from the second light source is diffused by the screen, while the excitation light output from the first light source develops a color different from that of the visible light by being projected in the fluorescent region.

15 Claims, 10 Drawing Sheets

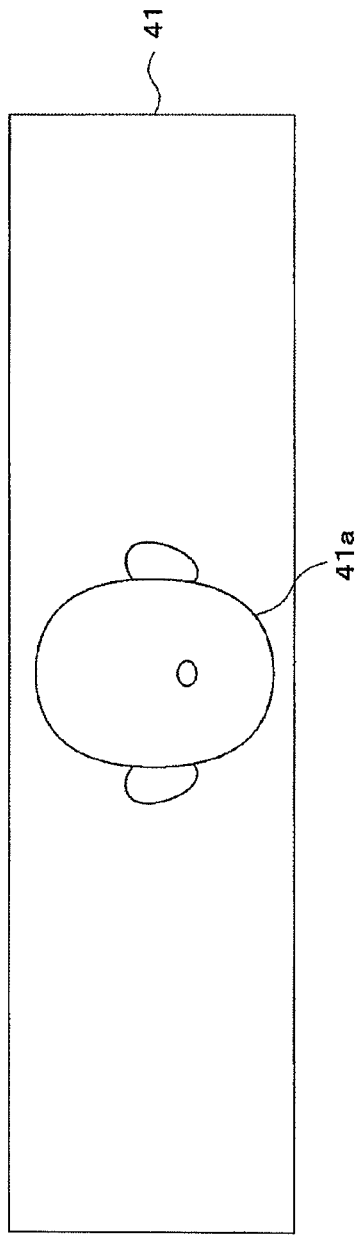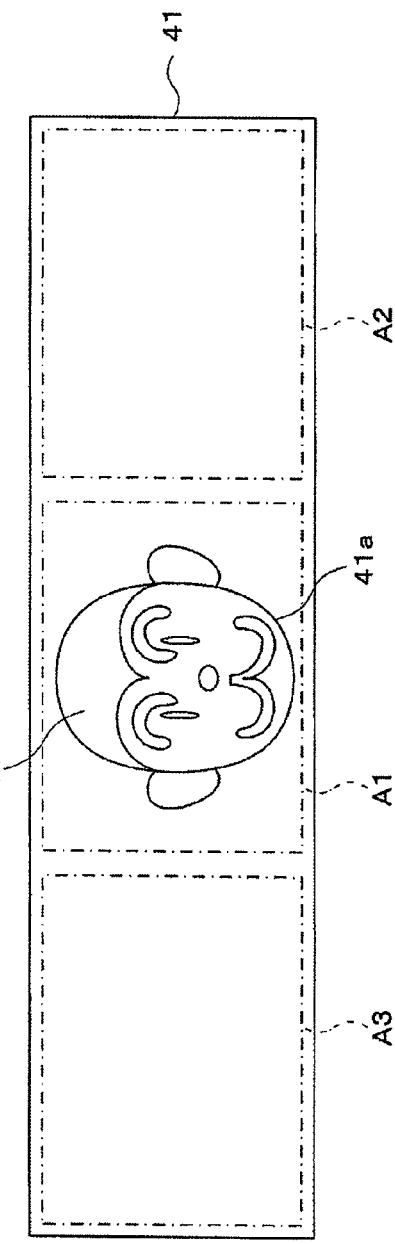

IMAGE DISPLAY DEVICE HAVING A SCREEN WITH A FLUORESCENT REGION

CROSS-REFERENCE TO RELATED APPLICATIONS

This is a continuation application of U.S. Ser. No. 12/186,860 filed Aug. 6, 2008, which claims priority to Japanese Patent Application Nos. 2007-206212 filed Aug. 8, 2007, 2007-206213 filed Aug. 8, 2007 and 2008-129294 filed May 16, 2008, all of which are hereby incorporated by reference herein.

BACKGROUND

1. Technical Field

The present invention relates to an image display device.

2. Related Art

For example, an image display device that displays an image by scanning with laser light in a main scanning direction (a horizontal direction) and a sub scanning direction (a vertical direction) while intensity of the laser light is modulated has been known (e.g. JP-A-2003-287802).

As such an image display device, one displaying a full color image has been proposed as disclosed in JP-A-2003-287802.

A full color image is displayed by color development of three primary colors, i.e. red, blue, and green. However, in JP-A-2003-287802, laser light beams in two colors among the three primary colors are respectively irradiated on a screen so as to develop the two colors on the screen by diffusion of each color. In addition, by irradiating a laser light beam in an ultraviolet color onto a fluorescent substance that is evenly applied on the screen, the fluorescent substance is excited to develop the other color among the three primary colors.

A full color image is displayed by using a fluorescent substance as the above, enabling downsizing of a light source to be used, and further downsizing of an image display device and the like.

However, in the image display device according to JP-A-2003-287802, in a case where a thickness of a fluorescent substance on a screen is made thin, most of laser light beams in an ultraviolet color or a blue-violet color that are used as excitation light transmit through the screen without contributing to excitation of the fluorescent substance. As a result, not only an output of the excitation light laser is wasted, but also a light emitting amount of a fluorescent substance is reduced, and an unintended color change occurs to an image to be displayed. On the other hand, in a case where the thickness of the fluorescent substance on the screen is made thick, laser light beams in two colors other than the excitation light are diffused by the fluorescent substance and deteriorated, making use efficiency of the laser light beams in two colors unfavorable. Therefore, issues such as leading to deterioration of image quality in contrast, brightness and the like, and not sufficiently achieving a low cost and downsizing due to a need of a light source with high intensity arise.

SUMMARY

An advantage of the invention is to provide an image display device capable of displaying a high quality image while achieving a low cost and downsizing.

The above advantage is attained by the following aspect of the invention.

An image display device according to an aspect of the invention includes: a screen having a fluorescent region including a fluorescent material; a light irradiation system, including: a first light source outputting excitation light exciting the fluorescent material; a second light source outputting visible light; a driving unit individually operating the first light source and the second light source corresponding to image information; and a scanning unit scanning with a light beam output from each of the first light source and the second light source in a main scanning direction and a sub-scanning direction intersecting with the main scanning direction on the screen; and an excitation light wavelength band reflector having a function to reflect light in a wavelength band of the excitation light toward the screen, and formed on an output side of a light beam from the light irradiation system with respect to the screen. The visible light output from the second light source develops a first color by diffusion by being projected on the screen, while the excitation light output from the first light source develops a second color by fluorescence by being projected in the fluorescent region, the second color being different from the color developed by the visible light so as to display an image corresponding to the image information on the screen.

The excitation light having transmitted through the screen without contributing to the excitation of the fluorescent material is thus reflected (returned) to the screen (the fluorescent region), thereby inducing the excitation of the fluorescent material. As a result, apparent luminous efficiency of the fluorescent material by the excitation light (conversion efficiency from the excitation light to the fluorescence) is improved, and insufficient color development by the fluorescence is easily and securely prevented, thereby displaying a high grade image. Further, since the excitation light is prevented from unnecessarily leaking, even when the excitation light is visible light, a high grade image can be displayed without loosing a color balance.

In the image display device as above, the screen may include a display region to display the image, while the fluorescent region is preferably formed evenly through a nearly whole area of the display region.

This can simplify forming of the fluorescent region, providing the image display device at a lower cost.

Further, the excitation light wavelength band reflector preferably has a function to prevent the excitation light from transmitting through the screen and leaking outside.

This can more securely prevent unnecessary leaking of the excitation light.

Furthermore, the excitation light wavelength band reflector is preferably formed with an optical multilayer thin film.

The excitation light wavelength band reflector can thus provide excellent wavelength selectivity, thereby preventing use efficiency of the visible light from the second light source from decreasing, and improving the luminous efficiency of the fluorescent material (conversion efficiency from the excitation light to the fluorescence) by the excitation light. Further, a wavelength selectivity band of the excitation light wavelength band reflector is optimized, thereby preventing the visible light from the second light source from attenuating, and preventing an unintentional color change in an image to be displayed from occurring.

In the image display device as above, the light irradiation system is preferably configured so that the second light source includes two light sources for outputting light beams in two colors among red, green, and blue, while the fluorescent region is formed so as to develop a color other than the two colors among red, green and blue by irradiation of the excitation light from the first light source.

A full color image can be thus displayed.

In this case, the light irradiation system is preferably configured so that the second light source includes two light sources in which one light source outputs a color light beam in red while the other light source outputs a color light beam in blue, and the fluorescent region develops a green color by irradiation of the excitation light from the first light source.

The first light source and the second light source are respectively formed with semiconductor lasers, thereby displaying a full color image while achieving downsizing and cost reduction of the image display device. At this stage, there are no effective methods to provide a semiconductor laser enabling high speed modulation and outputting green light. Therefore, in such a case, an effect to employ the aspect of the invention is remarkable.

Further, the light irradiation system is preferably formed so that the excitation light output from the first light source and the visible light output from the second light source are combined so as to be irradiated to a same region on the screen at a same time.

Therefore, scanning of the scanner can be performed with only one light beam, simplifying a configuration of the scanner. As a result, downsizing and cost reduction of the image display device can be achieved.

The image display device as above may further include a reflection excitation light reflector formed on an input side of the light beam from the light irradiation system with respect to the screen, and reflecting reflected light of the excitation light reflected at the excitation light wavelength band reflector toward the screen.

This can further improve use efficiency of the excitation light.

Further, the reflection excitation light reflector is preferably formed with a polarizer.

For example, in a case where linearly polarized laser is used as the excitation light, polarization of the excitation light is changed when being reflected at the excitation light wavelength band reflector. Therefore, the reflect light that has been changed can be reflected at the reflection excitation light reflector toward the screen.

The image display device as above may preferably further include a fluorescence wavelength band reflector formed on the input side of the light beam from the light irradiation system with respect to the screen, allowing each of the visible light and the excitation light to transmit, and having a function to reflect light in one of a whole range and a part of a wavelength of fluorescence generated from the fluorescent region.

This allows the fluorescence scattering to the input side due to the fluorescent material (screen) to head to the output side, thereby improving a light amount of the fluorescence to be output (use efficiency of the fluorescence generated in the fluorescent region) and displaying a high luminance and high grade image. Further, if the fluorescence wavelength band reflector has wavelength selectivity, color purity can be improved, so that displaying a high luminance and high grade image can be achieved.

In the image display device as above, the fluorescence wavelength band reflector is preferably formed with an optical multilayer thin film.

The fluorescence wavelength band reflector can thus provide excellent wavelength selectivity, thereby preventing use efficiency of the excitation light from the first light source from decreasing, and improving use efficiency of the fluorescence generated in the fluorescent region. Further, the wavelength selectivity band of the fluorescence wavelength band reflector is optimized, thereby improving color purity and displaying an image superior in color reproducibility.

In the image display device as above, the first light source is preferably a laser light source.

The configuration of an optical system is thus simplified, achieving downsizing and cost reduction of the image display device.

Further, the screen preferably has a portion forming a three-dimensional concave-convex pattern.

A three-dimensional image is thus displayed, making expressiveness included in an image full of elements of surprise and vigor.

Furthermore, it is preferable that the screen be movable back and forth.

This can enhance a variety of expressions.

In addition, the three-dimensional concave-convex pattern is preferably formed to be dynamically changeable.

This can enhance the variety of expressions.

BRIEF DESCRIPTION OF THE DRAWINGS

The invention will be described with reference to the accompanying drawings, wherein like numbers reference like elements.

FIGS. 3A through 3C are diagrams for explaining a screen included in the image display device shown in FIG. 2. FIG. A is a plan view of a first screen when an image is not displayed, while 3B is a sectional view showing the first screen shown in FIG. 3A, and FIG. C is a plan view showing an example of the first screen when an image is displayed.

DESCRIPTION OF EXEMPLARY EMBODIMENTS

Preferred embodiments of an image display device according to the invention will be described with reference to the accompanying drawings.

First Embodiment

A first embodiment for an image display device according to the invention will be described first.

Figure 1:
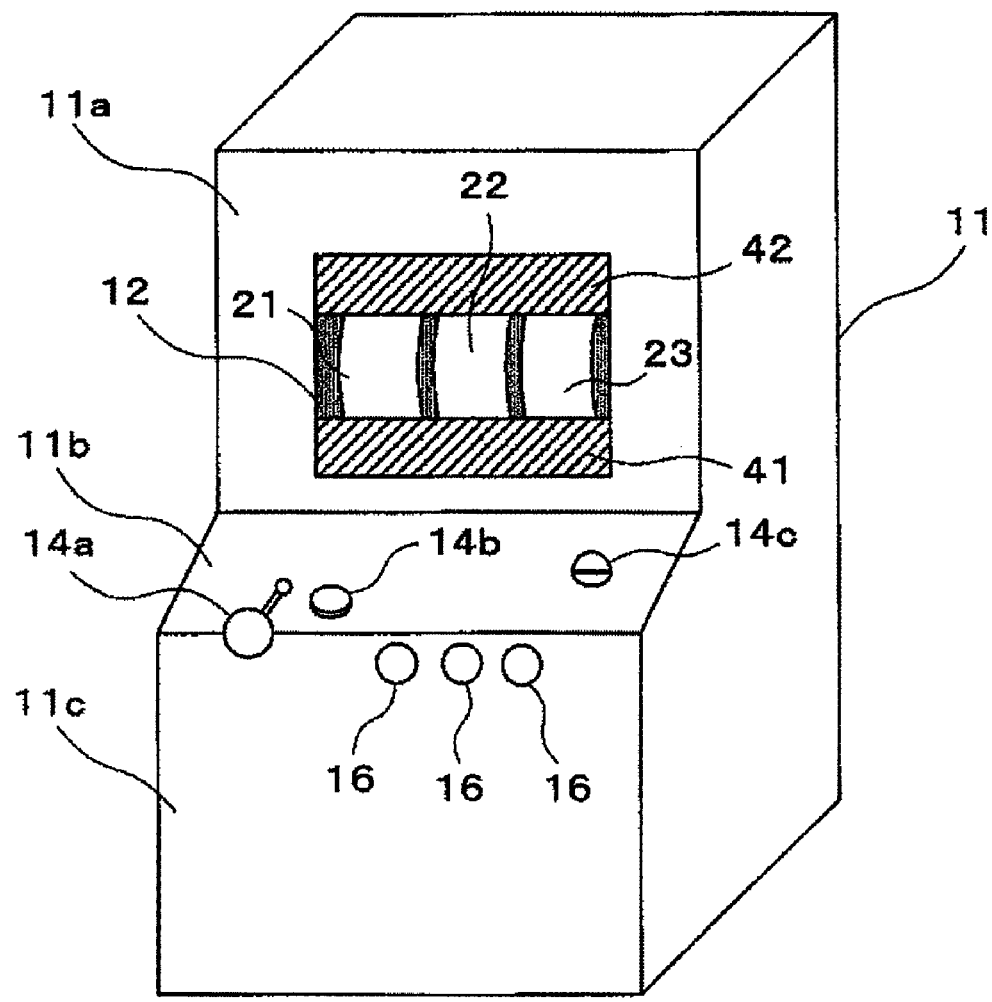
FIG. 1 is a perspective view illustrating an appearance of a slot machine employing an image display device according to a first embodiment of the invention.

FIG. 1 is a perspective view illustrating an appearance of a slot machine employing the image display device according to the first embodiment of the invention.

An example employing the image display device to a slot machine will be described below. However, the image display device according to the invention is not particularly limited to slot machines, but applicable to various devices including an image display portion.

A slot machine 10 includes a case 11 in a box-like shape, a display window 12 formed in a center of a panel surface 11a located on a front upper surface of the case 11. The case 11 has a start lever 14a, a bet button 14b, and a coin slot 14c respectively formed on a console 11b located in a center of the front face of the case 11. Further, three stop buttons 16 are formed on an upper part of a panel surface 11c located on a lower front part of the case 11.

Furthermore, inside the case 11, three of rotating reels 21, 22, and 23 are formed so as to face to the display window 12. The three rotating reels 21, 22, and 23 have patterns formed on their rotating surfaces and observable from an outside of the case 11 through the display window 12. In addition, inside the case 11, a first screen 41 (herein after, also just indicated as "screen 41") that is movable back and forth in upper and lower directions is formed about a lower portion of the display window 12, while a second screen 42 (hereinafter, also just indicated as "screen 42") that is movable back and forth in upper and lower directions is formed about an upper portion of the display window 12. The screens 41 and 42 compose a part of an image display device 30 to be described later, and an image is projected thereon by light irradiated from an inside of the case 11. Details on the image display device 30 will be described later.

After a coin is inserted to the coin slot 14c, and when a bet button 14b is pressed and the start lever 14a is operated by a player, each of the rotating reels 21, 22, and 23 individually starts rotating. Then, when each of the stop buttons 16 is pressed by the player, a corresponding one among the rotating reels 21, 22, and 23 stops rotating. In a case where when all of the rotating reels 21, 22, and 23 stop rotating, patterns displayed on the rotating surfaces are in an arrangement of a specific group, coins with respect to a hit are paid out. In this case, corresponding to a status of the game, the screens 41 and 42 appear in the display window 12 so as to show a display corresponding to the status of the game including various displays including a hit, an announcement, and a prelude, for example, on the screens 41 and 42. A specific display on the screens 41 and 42 includes a display indicating that it is a lucky symbol when a specific symbol such as a cherry, for example, appears.

Figure 2:
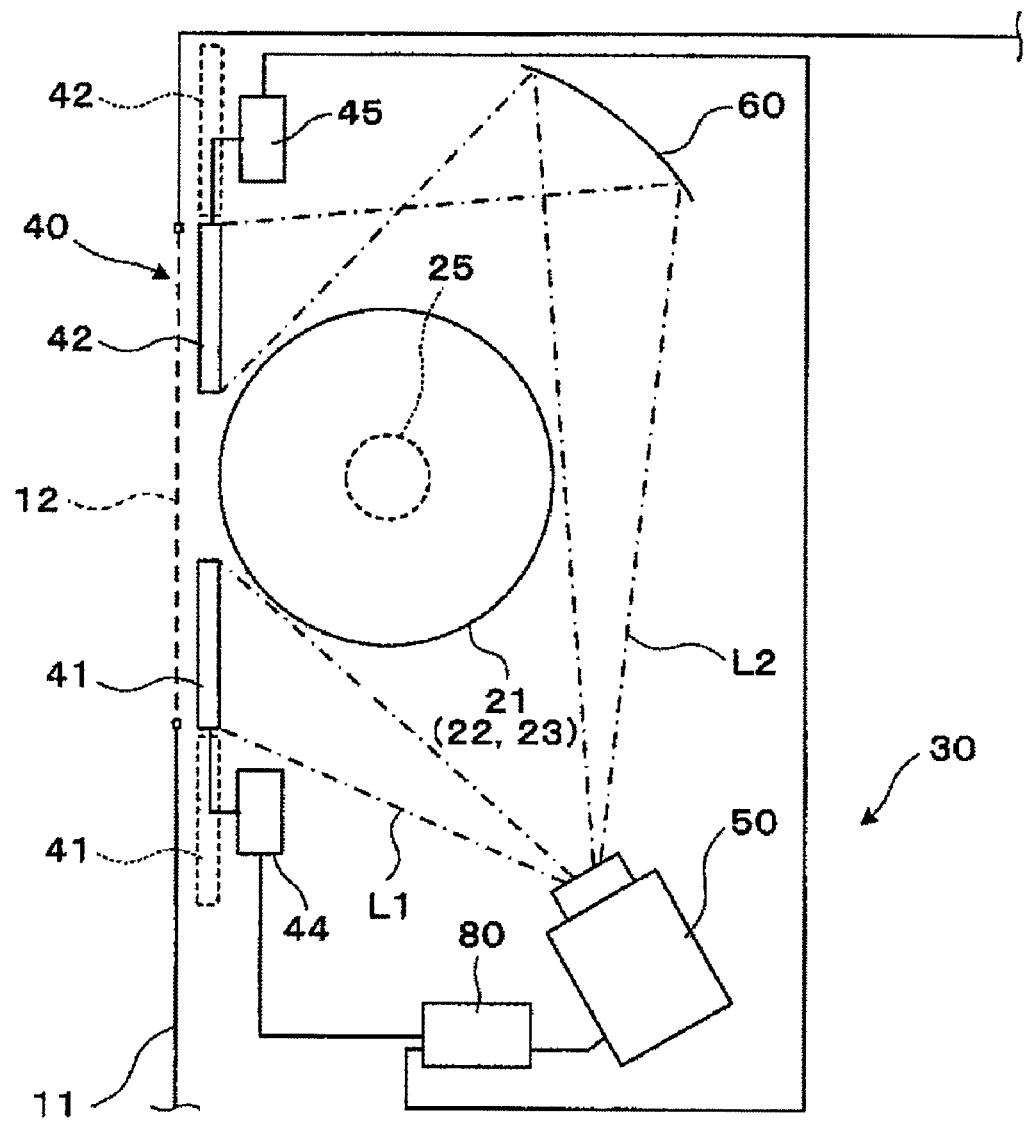
FIG. 2 is a longitudinal sectional view for explaining the image display device included in the slot machine shown in FIG. 1.

FIG. 2 is a longitudinal sectional view for explaining the image display device included in the slot machine shown in FIG. 1.

As described above, each of the rotating reels 21, 22, and 23 arranged so as to face to the display window 12 individually rotates about a horizontal axis by being operated by a motor 25 that is a rotating driver.

Around the rotating reels 21, 22, and 23 as the above, the image display device 30 according to the embodiment is disposed.

The image display device 30 is a direct projection type projector and provided with a screen unit 40, a projector body 50, a light guide optical system 60, and a display control unit 80.

The projector body 50 is configured to output two laser light beams L1 and L2 as described in detail later. The laser light beam L1 is output from the projector body 50 so as to pass through a lower side of the rotating reels 21, 22, and 23, directly input to the first screen 41 so as to scan the first screen 41. On the other hand, the laser light beam L2 is output from the projector body 50 so as to pass through a rear side of the rotating reels 21, 22, and 23, input to the second screen 42 through the light guide optical system 60 so as to scan the second screen 42.

The screen unit 40 is provided with the first screen 41 and the second screen 42 formed near the display window 12 as described above, a first lifting and lowering device 44 for moving the first screen 41 back and forth, and a second lifting and lowering device 45 for moving the second screen 42 back and forth. Here, both the lifting and lowering devices 44 and 45 serve as devices to move (back and forth) the screens 41 and 42 respectively when needed.

FIGS. 3A through 3C are diagrams for explaining the screen included in the image display device shown in FIG. 2. FIG. A is a plan view of the first screen 41 when an image is not displayed, while 3B is a sectional view showing the first screen 41 shown in FIG. 3A, and FIG. 3C is a plan view showing an example of the first screen 41 when an image is displayed.

The first screen 41 is in a substantially long strip shape. In a center of the first screen in a longitudinal direction, a three-dimensional portion 41a forming a three dimensional shape is provided. The three dimensional portion 41a has a three dimensional concavo-convex shape projecting to a front side. In the first embodiment, the three dimensional portion 41a formed as a convex portion projecting to the front side only is shown as an example. However, the three dimensional portion 41a may be formed as a concave portion projecting (denting) backward only, and also as a concavo-convex portion projecting backward and forward.

As described above, the first screen 41 receives the laser light beam L1 output from the projector body 50 shown in FIG. 2. The laser light beam L1 scans a nearly whole region on the first screen 41 including the three dimensional portion 41a in a main scanning direction and a sub-scanning direction intersecting with the main scanning direction. According to the above, for example, an expression EI replicating protrusions of a face can be drawn (displayed) on the three dimensional portion 41a corresponding to a hit, an announcement, and a prelude (refer to FIG. 3C).

In the description above, it is explained based on an assumption of that drawing an image (image display) is performed on the nearly whole surface of the first screen 41. However, the projector body 50 has a high degree of freedom for arranging a range to draw an image by the laser light beam L1. For example, an image can be drawn in any one of a first region A1 to a third region 3A shown in FIG. 3C, or displayed by switching the regions A1 to A3.

The first screen 41 is provided with a fluorescent region containing a fluorescent material, and configured to be capable of displaying an image by developing colors by diffusion of visible light as described later, and by fluorescence provided by exciting the fluorescent region by excitation light. Details on the first screen 41 will be described later.

Further, the second screen 42 (refer to FIG. 2) also has a configuration similar to that of the first screen 41 described above. By scanning of the laser light beam L2 output from the projector body 50, a three dimensional image or the like that changes corresponding to a hit, an announcement, and a prelude, for example, is displayed on a proper portion of the second screen 42.

The first lifting and lowering device 44 can lift or lower the first screen 41 under control of the display control unit 80 so as to move the first screen 41 back and forth between a display position (shown by a solid line) to be exposed at the lower portion of the display window 12 by lifting the first screen 41, and a non-display position (shown by a dotted line) to be escaped in the lower side of the display window 12 by lowering the first screen 41. That is, when the first screen 41 is made not to be displayed, the first screen 41 is moved to the non-display position so as to be hidden. On the other hand, when the first screen 41 is made to be displayed, the first screen 41 is moved to the display position so as to be observable through the display window 12. In addition, image distortion caused by move of the three dimensional portion is included to a display arrangement accompanied with a course of a play, thereby increasing elements of surprise and punch.

The second lifting and lowering device 45 can also lift or lower the second screen 42 under the control of the display control unit 80 so as to move the second screen 42 back and forth between a display position (shown by a solid line) to be exposed at the upper portion of the display window 12 by lowering the second screen 42, and a non-display position (shown by a dotted line) to be escaped in the upper side of the display window 12 by lifting the second screen 42. That is, when the second screen 42 is made not to be displayed, the second screen 42 is moved to an escape position so as to be hidden. On the other hand, when the second screen 42 is made to be displayed, the second screen 42 is moved to the display position so as to be observable through the display window 12.

The projector body 50 (light irradiation system) is disposed in the lower side of the rotating reels 21, 22, and 23, and directly or indirectly irradiates the laser light beams L1 and L2 to the screens 41 and 42.

Figure 4:
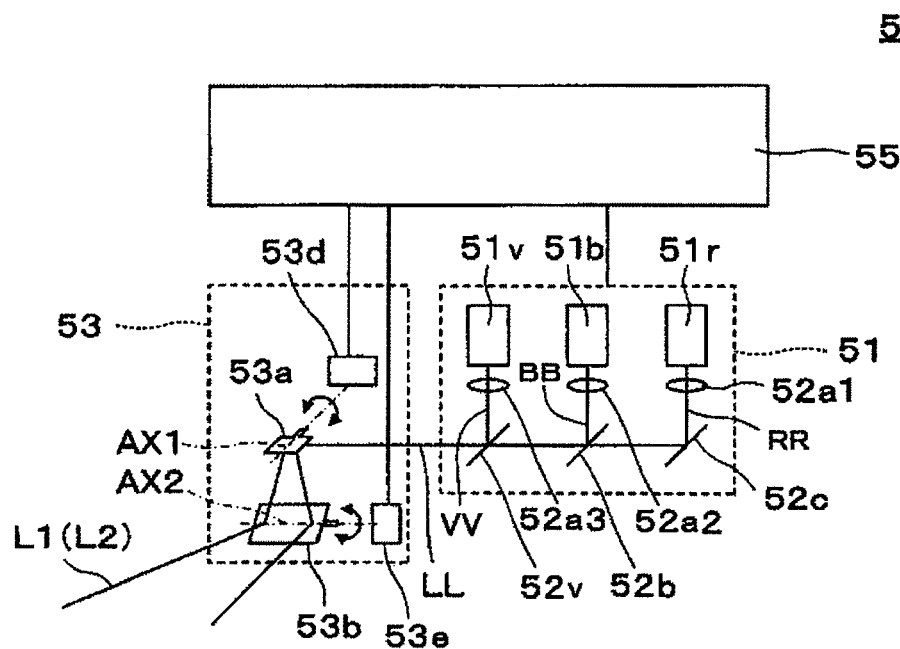
FIG. 4 is a schematic view illustrating an outline configuration of a light irradiation system included in the image display device shown in FIG. 2.

FIG. 4 is a schematic view illustrating a schematic configuration of the light irradiation system included in the image display device shown in FIG. 2.

The projector body 50 is provided with a light source device 51, a light scanner (scanning unit) 53, and a driver (driving unit) 55. The light source device 51 outputs a modulated thin light beam as a nearly parallel light, and the light scanner 53 performs scanning with the light beam from the light source device 51, while the driver 55 operates the light source device 51 and the light scanner 53 corresponding to an input signal.

The light source device 51 includes laser light sources (light sources) 51r, 51b, and 51v for respective colors, three collimator lenses 52a1, 52a2, and 52a3 formed with respect to the laser light sources 51r, 51b, and 51v, a mirror 52c, and dichroic mirrors 52v and 52b.

The laser light source 51v is a light source (first light source) outputting laser light VV (hereinafter, also just indicated as "excitation light") in blue-violet color, which is excitation light capable of exciting the fluorescence material. The laser light source 51r is a light source (second light source) outputting laser light RR (hereinafter, also just indicated as "visible light") in red, which is visible light. The laser light source 51b is a light source (second light source) outputting laser light VV (hereinafter, also just indicated as "visible light") in blue, which is visible light. The laser light RR, BB, and VV in respective colors is modulated corresponding to a drive signal transmitted from the driver 55, and nearly collimated by the collimator lenses 52a1, 52a2, and 52a3 that are collimator optical elements so as to be thin beams.

The dichroic mirror 52v has a characteristic to reflect the blue-violet laser light VV, while the dichroic mirror 52b has a characteristic to reflect the blue light BB.

The laser light RR reflected by the mirror 52c, the laser light VV reflected by the dichroic mirror 52v, and the laser light BB reflected by the dichroic mirror 52b are combined to be one laser light beam LL.

That is, the laser light VV, the laser light RR, and the laser light BB are combined so as to be irradiated in the same region on each of the screens 41 and 42 at the same time. Therefore, the light scanner 53 can perform scanning with only one light beam, simplifying a configuration of the light scanner 53. As a result, downsizing and cost reduction of the image display device 30 can be achieved.

In the light source device 51 described above, collimator mirrors may be used instead of the collimator lenses 52a1, 52a2, and 52a3. This case also allows a thin light beam that is a nearly parallel light beam to be formed. Further, if the laser light output from each of the laser light sources 51r, 51b, and 51v in respective colors is a light beam that is nearly parallel, the collimator lenses 52a1, 52a2, and 52a3 can be omitted. Furthermore, the laser light sources 51r, 51b, and 51v can be replaced by light sources such as light-emitting diodes generating a same light beam.

Accordingly, each of the laser light sources 51r, 51b, and 51v is a laser light source, simplifying a configuration of the optical system. As a result, downsizing and cost reduction of the image display device 30 can be achieved.

The light scanner 53 makes a light beam from each of the laser light sources 51r, 51b, and 51v scan the screens 41 and 42 in a main scanning direction and a sub-scanning direction intersecting with the main scanning direction, and is provided with mirrors 53a and 53b, actuators 53d and 53e.

The mirror 53a is formed so as to be rotatable about a rotation axis AX1, while the mirror 53b is formed so as to be rotatable about a rotation axis AX2. The actuator 53d is operated according to a drive signal from the driver 55, and adequately rotates the mirror 53a about the rotation axis AX1. The actuator 53e is operated according to a drive signal from the driver 55, and adequately rotates the mirror 53b about the rotation axis AX2. This allows the light scanner 53 to perform main scanning in a direction perpendicular to the rotation axis AX1 by the rotation of the mirror 53a, and to perform sub scanning in a direction perpendicular to the rotation axis AX2 by the rotation of the mirror 53b. As a result, the laser light LL through the mirrors 53a and 53b two-dimensionally scans a desired region as the laser light beams L1 and L2, thereby being directly drawn on an arbitrary position of the screens 41 and 42.

As the light scanner 53, for example, a two-axis galvano mirror, a Micro Electro Mechanical System (MEMS) element that includes an actuator uniformly formed on a semiconductor substrate by a thin film forming process, or the like can be used.

The driver 55 operates the light source device 51 and the light scanner 53 respectively corresponding to an electrical signal (information of an image) transmitted from a controller that is not illustrated due to omission. Then, while synchronizing the light source device 51 and the light scanner 53, the driver 55 adjusts intensity, a projecting position, and an irradiation timing of the laser light LL and the like by controlling operations of the light source device 51 and the light scanner 53.

Figure 5:
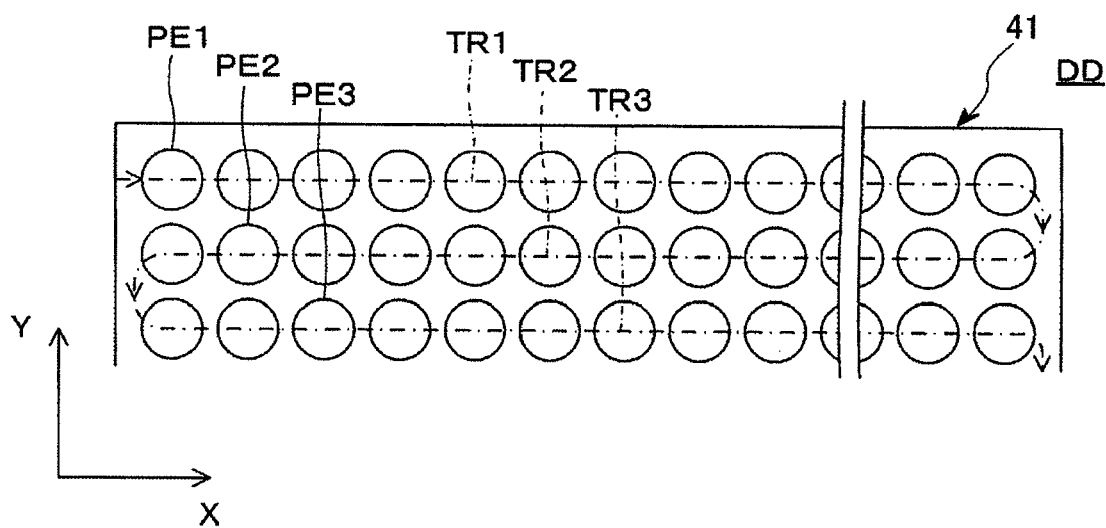
FIG. 5 is a diagram for explaining light scanning of the light irradiation system shown in FIG. 4.

FIG. 5 is a diagram for explaining light scanning of the light irradiation system (the projector body 50) shown in FIG. 4. Here, FIG. 5 schematically shows an image to be projected on the screen 41.

First, the laser light beam L1 (refer to FIG. 4) output from the projector body 50 scans the screen 41 along a trajectory TR1 in a positive direction of an X axis (toward the right in FIG. 5) from a top left end of an image displaying region DD. At that time, each output of the laser light sources 51r, 51b, and 51v shown in FIG. 4 is controlled so that a pixel PE1 aligned in the X direction is lit (projected) at a necessary luminance by the laser light beam L1 in a spot-like shape.

Next, the laser light beam L1 having reached to a right end of the image displaying region DD shifts by a pixel in a negative direction of a Y axis (toward the bottom in FIG. 5), and thereafter scans the screen 41 along a trajectory TR2 in a negative direction of the X axis (toward the left in FIG. 5). At that time, each output of the laser light sources 51$r$, 51$b$, and 51$v$ shown in FIG. 4 is controlled so that a pixel PE2 aligned in the X direction is lit (projected) at a necessary luminance by the laser light beam L1 in a spot-like shape.

Again, the laser light beam L1 having reached to the left end of the image displaying region DD shifts by a pixel in the negative direction of the Y axis, and thereafter scans the screen 41 along a trajectory TR3 in the positive direction of the X axis. At that time, each output of the laser light sources 51$r$, 51$b$, and 51$v$ shown in FIG. 4 is controlled so that a pixel PE3 aligned in the X direction is lit at a necessary luminance by the laser light beam L1 in a spot-like shape. The operations as described above are repeated, so that the laser light beam L1 scans a whole area of the image displaying region DD.

FIG. 5 illustrates a case of drawing on a flat portion. However, similar drawing is also possible on the three dimensional portion 41$a$ described above. In the three dimensional portion 41$a$, since the pixels PE1, PE2, and so on as shown in FIG. 5 are projected on a curved surface, distortion occurring to an image can be preliminarily corrected so as to project the image. For this purpose, the display control unit 80 described later can include an image processing circuit, or a memory so as to enable a high-speed calculation process and a storage of large numbers of images. In this way, projection distortion can be preliminary removed by an image process such as coordinate conversion, or an image that can cancel out the projection distortion by the three dimensional portion 41$a$ can be preliminary stored, thereby projecting an image without distortion on the three dimensional portion 41$a$.

The light guide optical system 60 (refer to FIG. 2) is an intervening mirror disposed on a light path of the laser light beam L2 to reflect the laser light beam L2 output from the projector body 50 toward the second screen 42. Here, a reflecting surface of the light guide optical system 60 can be formed to be a curved surface (aspheric surface) in an arbitral shape as it is not limited to a spherical surface only, and further, configured so that the light beam output from the projector body 50 is adequately input to a projection region of the second screen 42. Further, the light beam output from the projector body 50 is an extremely narrow beam as described above, thereby not causing blurring or distortion to the image drawn on the second screen 42.

Figure 6:
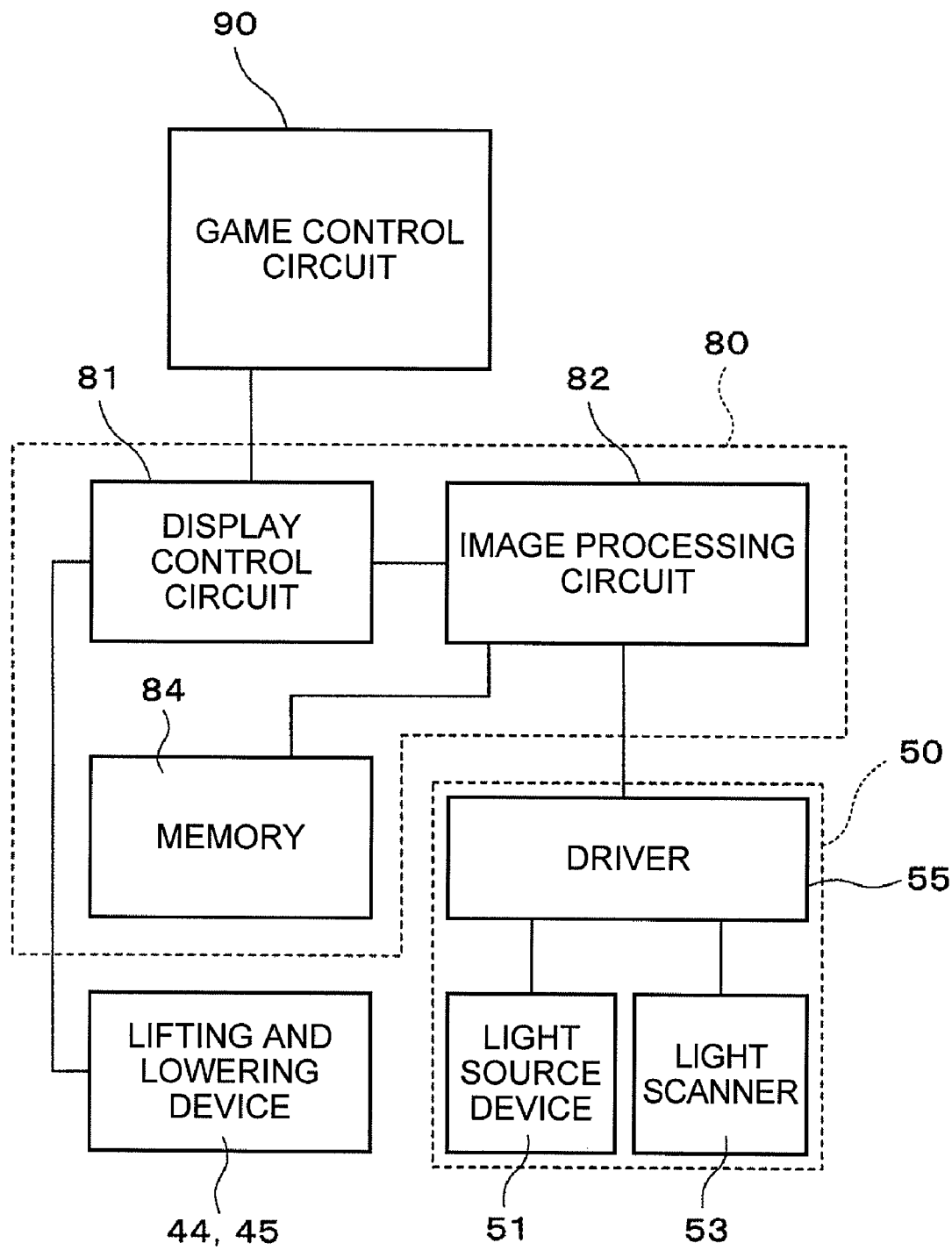
FIG. 6 is a block diagram showing an outline configuration of a control system of the image display device shown in FIG. 2.

FIG. 6 is a block diagram showing an outline configuration of a control system of the image display device shown in FIG. 2.

The image controller 80 is a circuit device operating based on a control signal from a game control circuit 90, and includes a display control circuit 81, an image processing circuit 82, and a memory 84.

The image control circuit 81 controls an overall operation of the image display device 30 based on a control signal from the game control circuit 90. More specifically, the image control circuit 81 determines an operation timing of the projector body 50 and display content based on a control signal from the game control circuit 90, while controlling an operation of the lifting and lowering devices 44 and 45.

The image processing circuit 82 adequately operates the driver 55 based on a command from the game control circuit under the control of the display control circuit 81 so that the projector body 50 performs necessary drawing. The memory 84 stores image information such as a picture and a character as an image source to be projected on the screens 41 and 42 by the projector body 50.

In the slot machine 10 described above, the light scanner 53 makes the laser light beams L1 and L2 from the light source 51 scan the screens 41 and 42. Therefore, any images are drawn on the screens 41 and in high quality, providing various and elaborate arrangement corresponding to the status of the game. When the laser light beams L1 and L2 draw an image on the screens 41 and 42 by the scanner 53, a position and area to display an image including a position of the screens 41 and 42 are freely changeable, thereby enhancing a variety of expression. Further, this can also display a three dimensional image on the three dimensional portion 41$a$ by three dimensional drawing, thereby making display arrangement full of elements of surprise and vigor corresponding to a status of a game.

Here, the details on the first screen 41 will be described. Since the second screen 42 has the same configuration as that of the first screen 41, the description of the second screen 42 will be omitted.

Figure 7:
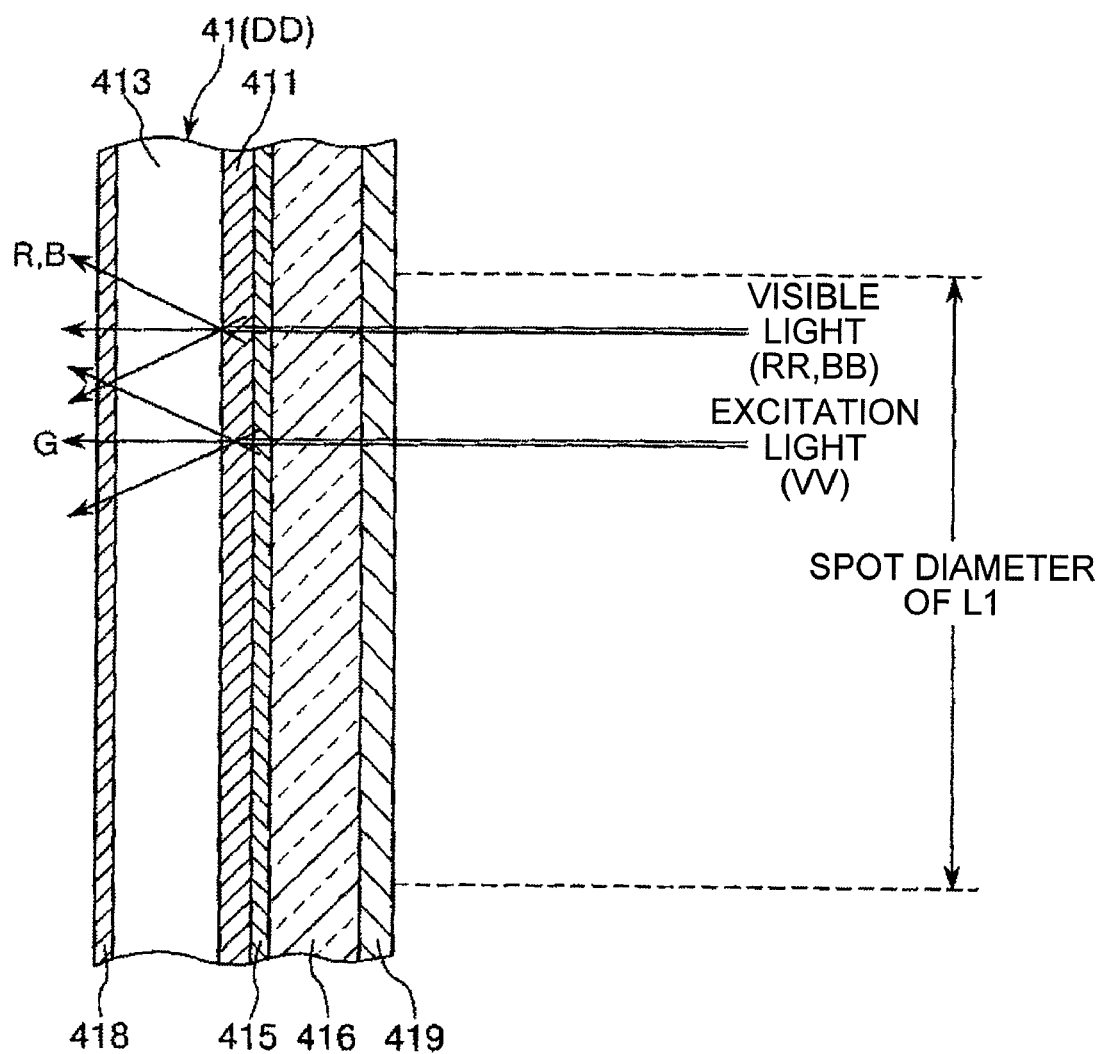
FIG. 7 is a sectional view illustrating the screen included in the image display device shown in FIG. 2 and the periphery.
Figure 8:
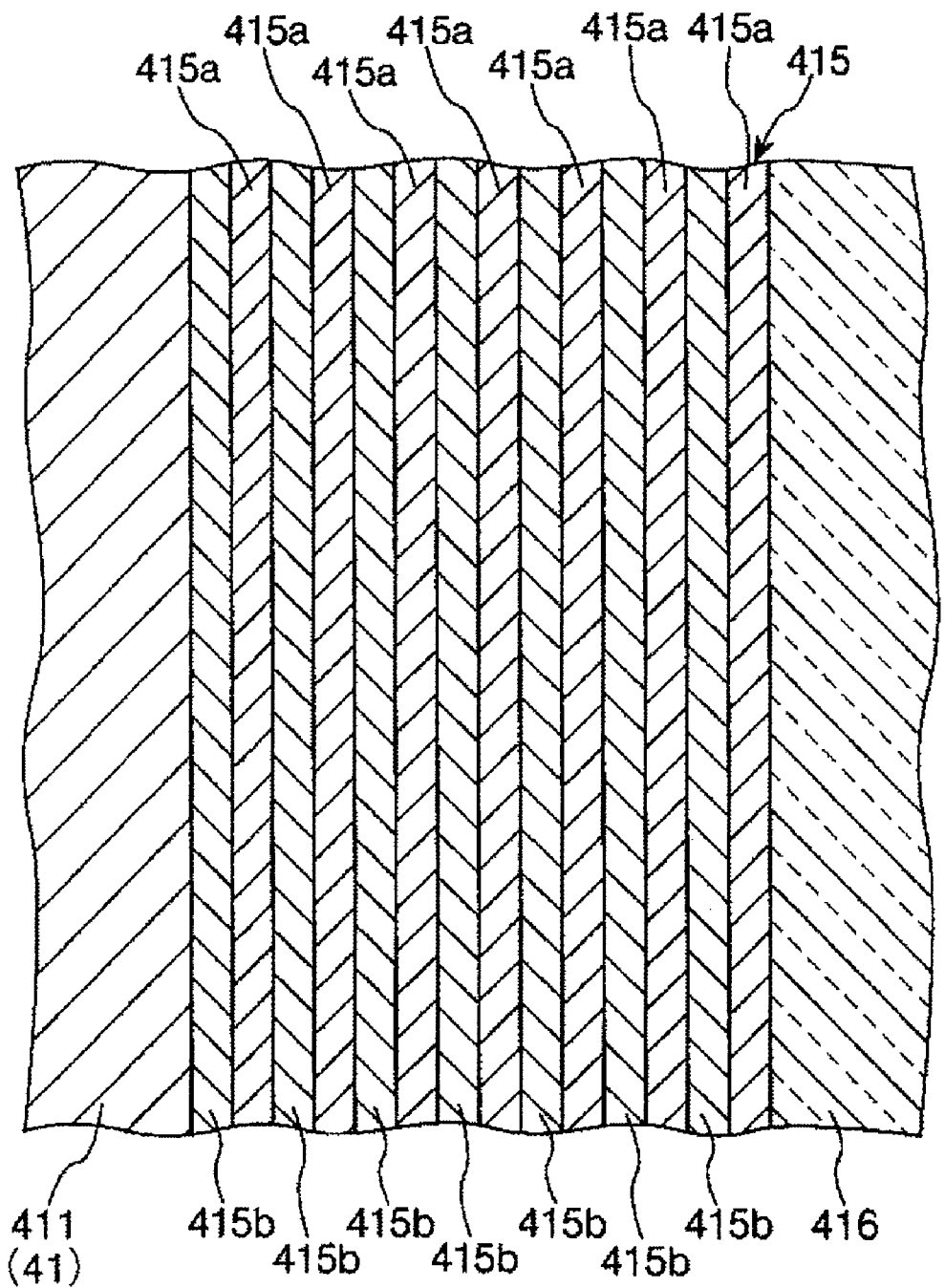
FIG. 8 is a sectional view illustrating a configuration of a fluorescence wavelength band reflector formed on an input side with respect to the screen shown in FIG. 7.
Figure 9:
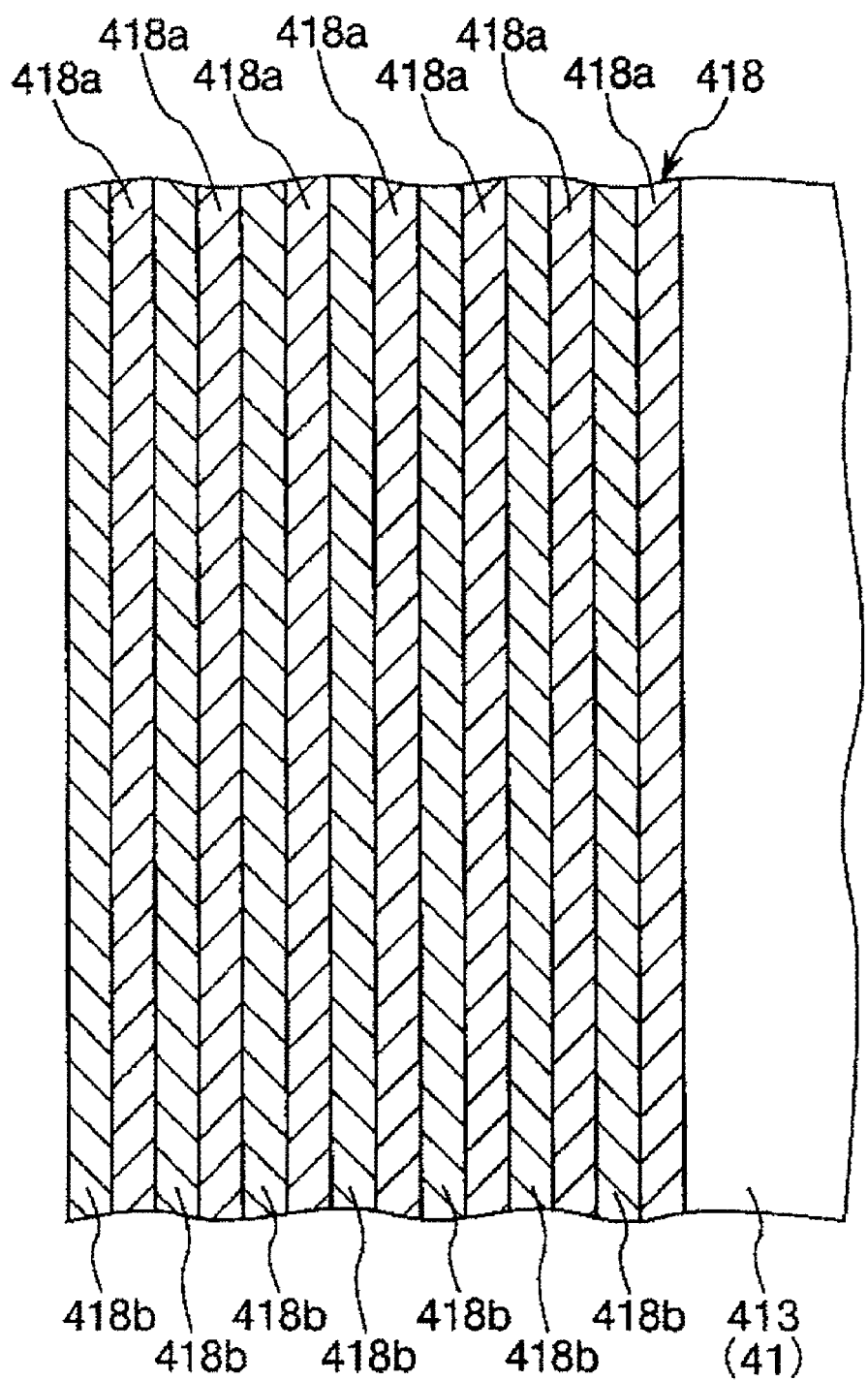
FIG. 9 is a sectional view showing a configuration of an excitation light wavelength band reflector formed on an output side with respect to the screen shown in FIG. 7.

FIG. 7 is a sectional view illustrating a screen included in the image display device shown in FIG. 2 and the periphery, while FIG. 8 is a sectional view illustrating a configuration of a fluorescence wavelength band reflector formed on an input side with respect to the screen shown in FIG. 7. Further, FIG. 9 is a sectional view showing a configuration of an excitation light wavelength band reflector formed on an output side with respect to the screen shown in FIG. 7.

The first screen 41 includes a screen body 413 as shown FIG. 7. On a surface of the screen body 413 on an input side of the laser light beam L1, a fluorescent region 411 is formed.

Further, visible light output from the laser light sources 51$r$ and 51$b$ serving as the second light source is projected on the screen 41 (fluorescent region 411) and develops colors by diffusion, while excitation light output from the laser light source 51$v$ serving as the first light source is projected on the fluorescent region 411 and develops a different color from the visible light by fluorescence, displaying an image on the first screen 41. More specifically, a red color R and a blue color B are developed by the laser light beams RR and BB, while a green color G by fluorescence is developed by the excitation light VV, displaying a full color image on the first screen 41.

Then, on the input side of the laser light beam L1 with respect to the screen 41 (fluorescent region 411), the fluorescence wavelength band reflector (fluorescence reflecting layer) 415, the light transmissive layer 416, and the reflection excitation light reflector 419 are sequentially layered in this order. On the other hand, on an output side of the laser light beam L1 with respect to the screen 41 (screen body 413), an excitation light wavelength band reflector (excitation light reflecting layer) 418 is formed.

The screen body 413 is composed of a diffuser that can diffuse light, and has a function to display an image by diffusing light having a wavelength component corresponding to the laser light beams RR and BB among wavelength components included in the laser light beam L1, and fluorescence generated in the fluorescent region 411. Further, there is a case where the fluorescent region 411 itself serves as a diffuser. In this case, the screen body 413 is equal to the fluorescent region 411. Similarly, in a case where a fluorescent material is included in the screen body 413, the screen body 413 is also equal to the fluorescent region 411.

In the first embodiment, the fluorescent region 411 is evenly formed in a nearly whole of a display region for displaying an image on the screen 41. Therefore, forming of the fluorescent region 411 is simplified, providing the image display device 30 at a lower cost.

The fluorescent material included in the fluorescent region 411 as above is not particularly limited, and various fluorescent materials can be used as long as they emit green fluorescence that is excited by the laser light beam VV serving as the excitation light as described above. However, one that is not excited by laser light beams from the laser light sources 51r and 51b, and has a high luminous efficiency by the laser light beam VV from the laser light source 51v, that is, ZnS; Cu, or Al, for example, is preferably used.

The fluorescent material that glows green includes, for example, 9,10-bis[(9-ethyl-3-carbazole)-vinylenyl]-anthracene, poly(9,9-dihexyl-2,7-vinylenefluorenylene), poly [(9,9-dioctylfluorene-2,7-diyl)-co(1,4-diphenylene-vinylene-2-methoxy-5-{2-ethylhexyloxy}benzene)], and poly [(9,9-dioctyl-2,7-divinylenefluorenylene)-alt-co-(2-methoxy-5-(2-ethoxyhexyloxy)-1,4-phenylene)]. One of them alone or two or more of them in combination can be used.

Accordingly, if the fluorescent region 411 is configured to develop a green color by irradiation of the excitation light from the laser light source 51v, each of the laser light sources 51r, 51b, and 51v can be formed with a semiconductor laser so as to display a full color image while downsizing and cost reduction of the image display device 30 are achieved. At this stage, there are no effective methods to provide a semiconductor laser outputting green light. Therefore, in such a case, an effect to employ the invention is remarkable.

In the first embodiment, green light is emitted by fluorescence. However, it is also possible to emit red light and blue light by fluorescence.

The fluorescent material that glows red includes, for example, tris(1-phenylisoquinoline)iridium(III), poly[2,5-bis(3,7-dimethyloctyloxy)-1,4-phenylenevinylene], poly[2-methoxy-5-(2'-ethylhexyloxy)-1,4-(1-cyanovinylene)phenylene], and poly[2-methoxy-5-(3,7-dimethyloctyloxy)-1,4-phenylenevinylene]. One of them alone or two or more of them in combination can be used.

Further, the fluorescent material that glows blue includes, for example, 4,4'-bis(9-ethyl-3-carbazovinylene)-1,1'-biphenyl, poly[(9,9-dioctylfluorene-2,7-diyl)-co-(2,5-dimethoxybenzene-1,4-diyl)], poly[(9,9-dihexyloxyfluorene-2,7-diyl)-alt-co-(2-methoxy-5-{2-ethoxyhexyloxy}phenylene-1,4-diyl)], and poly[(9,9-dioctylfluorene-2,7-diyl)-co-(ethylnylbenzene)]. One of them alone or two or more of them in combination can be used.

The fluorescent region 411 as above can be relatively easily formed by various film forming methods and coating methods.

The fluorescence wavelength band reflector 415 is formed on the input side of the laser light beam L1 with respect to the screen 41, and has a function to reflect fluorescence generated in the fluorescent region 411 while allowing each of the laser light beams RR, BB, and VV in the laser light beam L1 to transmit. This can change a direction of the fluorescence diffusing to the input side due to the screen 41 from the input side to the output side where it should be, thereby increasing a light amount of the fluorescence to be output (use efficiency of the fluorescence) and displaying a high grade image. Further, if the fluorescence wavelength band reflector 415 has wavelength selectivity, a color purity can be further improved, so that displaying high luminance and high grade image can be achieved.

In the first embodiment, the fluorescence wavelength band reflector 415 is joined to a surface on a fluorescent region 411 side of the screen 41. This allows a distance between the screen 41 and the fluorescence wavelength band reflector 415 to be minimized or 0 (zero), thereby making the fluorescence reflected at the fluorescence wavelength band reflector 415 return to a desired pixel. As a result, unintended mixed colors, color blurring, and the like are prevented, achieving a high grade image display.

The fluorescence wavelength band reflector 415 as the above is not particularly limited as long as it has a function described above. However, for example, an optical multilayer thin film (dielectric multilayer film) or the like may be used to form the fluorescence wavelength band reflector 415 as shown in FIG. 8.

More specifically, the fluorescence wavelength band reflector 415 is formed with a plurality sets of low refractive index layers 415a and high refractive index layers 415b alternately layered as shown in FIG. 8. In the fluorescence wavelength band reflector 415 as the above, each thickness of the low refractive index layers 415a and the high refractive index layers 415b is arranged with respect to a wavelength in which the fluorescence generated of the fluorescent region 411 in a whole region or a part thereof only is reflected at high efficiency, while the laser light beam L1 from the projector body 50 is allowed to be transmitted.

A material to form each of the high refractive index layers 415b as described above is not particularly limited as long as the material can provide an optical characteristic required for the fluorescence wavelength band reflector 415, and the examples include $Ti_2O$, $Ta_2O_5$, and niobium oxide.

Further, a material to form each of the low refractive index layers 415a is not particularly limited as long as the material can provide an optical characteristic required for the fluorescence wavelength band reflector 415, and the examples include $MgF_2$ and $SiO_2$.

Further, the total number of layers of the high refractive index layers 415b and the low refractive index layers 415a in the fluorescence wavelength band reflector 415 is not particularly limited as long as an optical characteristic required for the fluorescence wavelength band reflector 415 is provided. However, it is preferably 10 layers or more, and more preferably, from 10 to 40 layers.

The fluorescence wavelength band reflector 415 formed of multilayer films as above can obtain a desired characteristic by arranging (adjusting) a thickness, the number of layers, and materials of the high refractive index layers 415b and the low refractive index layers 415a forming the fluorescence wavelength band reflector 415.

Alternatively, the fluorescence wavelength band reflector 415 can be omitted.

On an opposite surface of the fluorescence wavelength band reflector 415 from the fluorescent region 411, the light transmissive layer 416 is formed.

The light transmissive layer 416 can serve as a spacer to keep a distance between the reflection excitation light reflector 419 to be described later and the fluorescence wavelength band reflector 415 optimum. The light transmissive layer 416 as above is made of glass, or resin, for example, and configured to transmit light of each of the wavelengths for red, blue, green, and blue-violet colors.

Alternatively, the light transmissive layer 416 can be omitted. In this case, for example, the reflection excitation light reflector 419 is formed on the fluorescence wavelength band reflector 415.

On an opposite surface of the light transmissive layer 416 from the fluorescence wavelength band reflector 415 as the above, the reflection excitation light reflector 419 is formed. That is, the reflection excitation light reflector 419 is formed on the input side of the laser light beam L1 from the projector body 50 with respect to the fluorescence wavelength band reflector 415.

The reflection excitation light reflector 419 has a function to reflect reflected light of the excitation light at the excitation light wavelength band reflector 418 to be described later toward the screen 41. The function as the above can further improve use efficiency of the excitation light.

More specifically, a part of the reflected light of the excitation light (reflected excitation light) reflected at the excitation light wavelength band reflector 418 toward the screen 41 contributes to excitation of the fluorescent material in the fluorescent region 411. However, rest of the reflected light transmits through the screen 41 (fluorescent region 411) without contributing to the excitation of the fluorescent material in the fluorescent region 411. Therefore, by forming the reflection excitation light reflector 419 as described above, the rest of the reflected light described above is reflected toward the screen 41 and used for the excitation of the fluorescent material in the fluorescent region 411, thereby improving the use efficiency of the excitation light.

The reflection excitation light reflector 419 as above allows the laser light beam L1 from the projector body 50 to transmit and also has the function described above.

Therefore, the reflection excitation light reflector 419 is preferably composed of a polarizer. For example, in a case where the linearly polarized laser is used as the excitation light, polarized light of the excitation light is deflected when transmitting through the screen body 413 that is a diffuser, in addition to a change of the polarized light when being reflected at the excitation light wavelength band reflector 418. Therefore, a part of the deflected light can be reflected at the reflection excitation light reflector 419 toward the screen 41.

Alternatively, the reflection excitation light reflector 419 as above can be omitted.

On the other hand, the excitation light wavelength band reflector 418 formed on an opposite side (side to observe) of the input side of the laser light beam L1 with respect to the screen 41 has a function to reflect the excitation light toward the screen 41 (more specifically, the fluorescent region 411). Therefore, the excitation light having transmitted through the screen 41 without contributing to the excitation of the fluorescent material is returned to the screen 41 (the fluorescent region 411) so as to induce the excitation of the fluorescent material. As a result, luminous efficiency of the fluorescent material by the excitation light (conversion efficiency from the excitation light to the fluorescence) is improved, while insufficient color development by the fluorescence is easily and securely prevented, thereby displaying a high grade image. Further, since the excitation light is prevented from unnecessarily leaking, even when the excitation light is visible light, a high grade image can be displayed without loosing a color balance.

Further, the excitation light wavelength band reflector 418 has a function to transmit a wavelength of light from the laser light source 51r, and 51b, and a wavelength of the fluorescence generated in the fluorescent region 411, that is, each wavelength for the light in red, blue and green. Thus the excitation light wavelength band reflector 418 is prevented from disturbing an image to display.

Further, the excitation light wavelength band reflector 418 is not particularly limited as long as it has a function described above. However, it is preferable to be made of an optical multilayer thin film. Accordingly, the excitation light wavelength band reflector 418 can provide superior wavelength selectivity (as a wavelength selectivity band is narrowed), thereby preventing use efficiency of the visible light from the laser light sources 51r and 51b from decreasing, and improving the luminous efficiency of the fluorescent material (conversion efficiency from the excitation light to the fluorescence) by the excitation light. Further, the wavelength selectivity band of the excitation light wavelength band reflector 418 is optimized, thereby preventing the visible light from the light sources 51r and 51b from attenuating, and preventing an unintentional color change in an image to be displayed from occurring.

The excitation light wavelength band reflector 418 as the above is not particularly limited as long as it has a function described above. However, for example, an optical multilayer thin film (dielectric multilayer film) or the like may be used to form the excitation light wavelength band reflector 418 as shown in FIG. 9.

More specifically, similarly to the fluorescence wavelength band reflector 415, the excitation light wavelength band reflector 418 is formed by a plurality sets of low refractive index layers 418a and high refractive index layers 418b alternately layered as shown in FIG. 9. The excitation light wavelength band reflector 418 as above allows each wavelength for the light in red, blue and green to transmit, and also has the low refractive index layers 418b and the high refractive index layers 418a whose thicknesses are arranged with respect to the wavelengths so as to reflect only the excitation light at high efficiency.

A material to form each of the high refractive index layers 418b as described above is not particularly limited as long as the material can provide an optical characteristic required for the excitation light wavelength band reflector 418, and the examples include $Al_2O_3$, $HfO_2$, $ZrO_2$, and $ThO_2$.

Further, a material to form each of the low refractive index layers 418a is not particularly limited as long as the material can provide an optical characteristic required for the excitation light wavelength band reflector 418, and the examples include $MgF_2$ and $SiO_2$.

The total number of layers of the high refractive index layers 418b and the low refractive index layers 418a in the excitation light wavelength band reflector 418 is not particularly limited as long as an optical characteristic required for the excitation light wavelength band reflector 418 is provided. However, it is preferably 10 layers or more, and more preferably, from 10 to 40 layers.

The excitation light wavelength band reflector 418 formed of multilayer films as above can obtain a desired characteristic by arranging (adjusting) a thickness, the number of layers, and materials of the high refractive index layers and the low refractive index layers forming the excitation light wavelength band reflector 418.

According to the image display device 30 as described above, the excitation light having transmitted through the screen 41 without contributing to the excitation of the fluorescent material can be reflected (returned) toward the screen 41 (the fluorescent region 411) so as to induce the excitation of the fluorescent material. As a result, apparent luminous efficiency of the fluorescent material by the excitation light (conversion efficiency from the excitation light to the fluorescence) is improved, and insufficient color development by the fluorescence is easily and securely prevented, thereby displaying a high grade image. Further, since the excitation light is prevented from unnecessarily leaking, even when the excitation light is visible light, a high grade image can be displayed without loosing a color balance.

In particular, as it is superior in the use efficiency of the excitation light, even if the fluorescent region 411 is reduced in thickness, insufficient color development by the fluorescence in the fluorescent region 411 can be prevented. Further, by reducing the fluorescent region 411 in thickness, the visible light in the fluorescent region 411 (in red and blue in the first embodiment) is prevented from attenuating, thereby efficiently displaying a high grade image.

Second Embodiment

Next, an image display device according to a second embodiment of the invention will be described.

Figure 10:
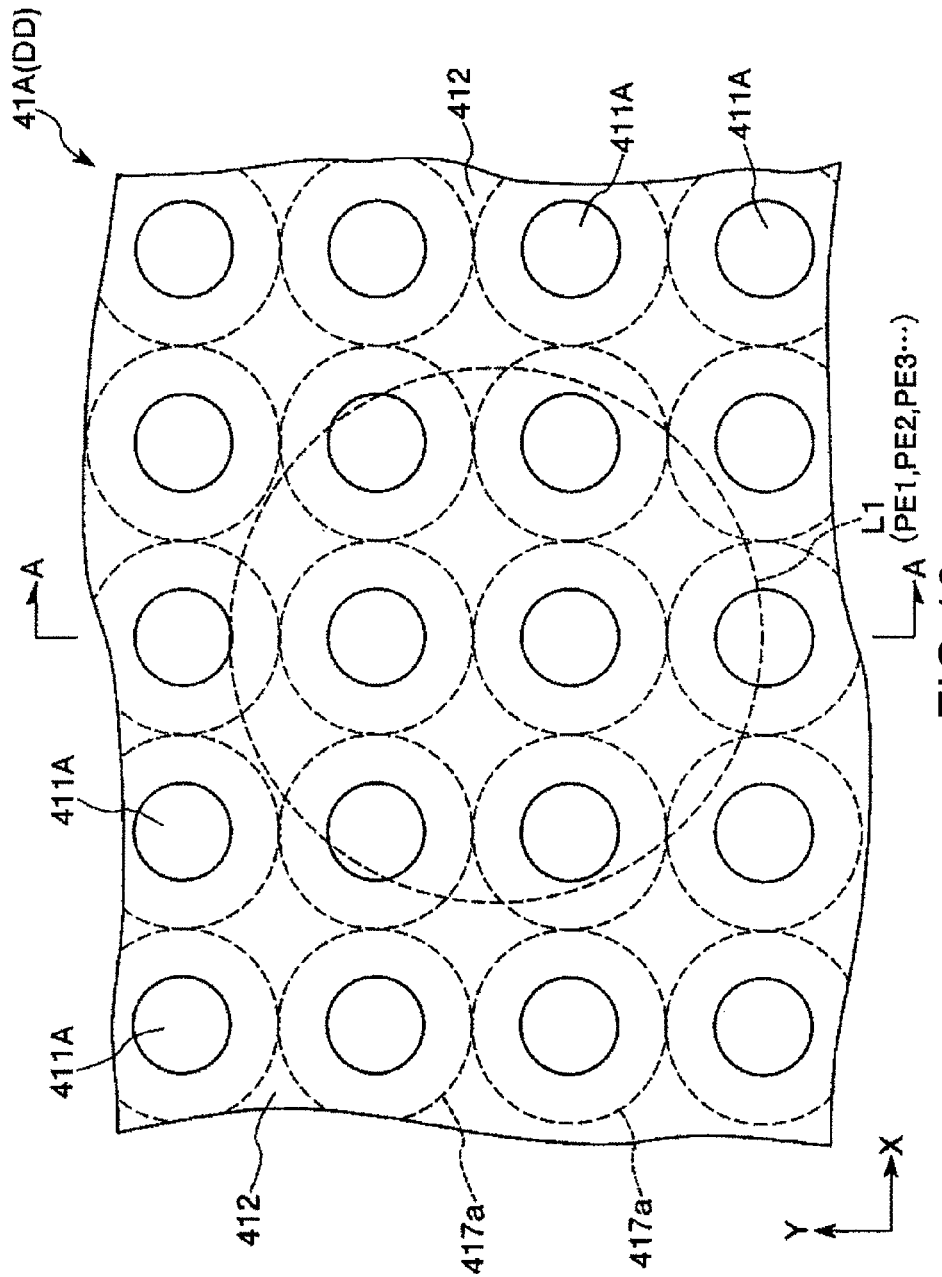
FIG. 10 is an enlarged plan view showing a screen included in an image display device according to a second embodiment of the invention.
Figure 11:
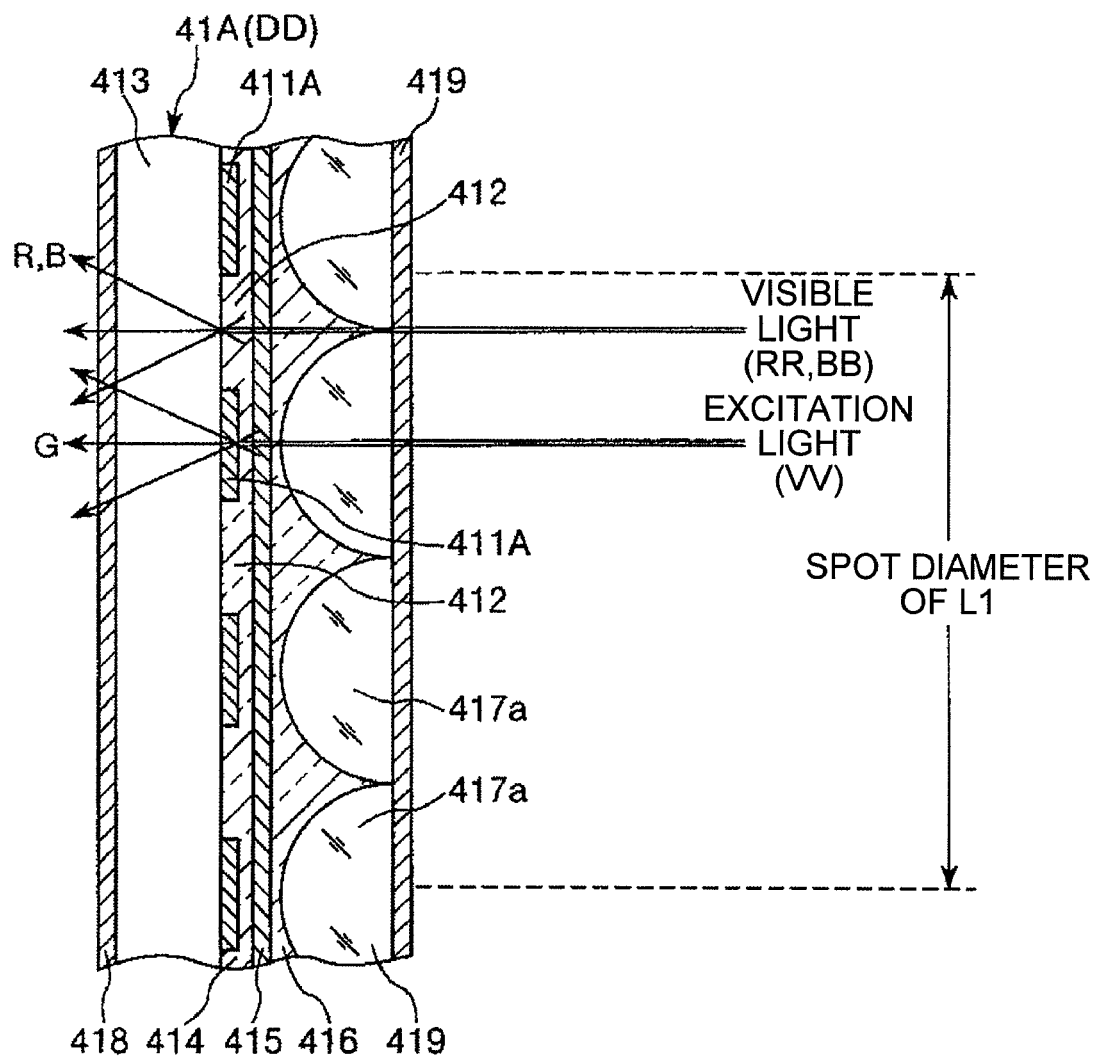
FIG. 11 is a sectional view taken along a line A-A in FIG. 10.

FIG. 10 is an enlarged plan view showing a screen included in the image display device according to the second embodiment of the invention, while FIG. 11 is a sectional view taken along a line A-A in FIG. 10.

The image display device according to the second embodiment is the same as the image display device according to the first embodiment described above except for a configuration of a fluorescent region and inclusion of a microlens array.

Such an image display device includes a first screen 41A instead of the first screen 41 in the first embodiment described above, and a microlens array 417 formed between the light transmissive layer 416 and the reflection excitation light reflector 419.

The first screen 41A includes a plurality of fluorescent regions 411A including a fluorescent material, and a nonfluorescent region 412 substantially excluding fluorescent materials. The plurality of fluorescent regions 411A is formed so that a large number of them are dispersed in a plan view as shown in FIG. 10, and the nonfluorescent region 412 is formed to fill in a gap between the fluorescent regions 411A.

Since the first screen 41A has the configuration as above, visible light output from the laser light sources 51r and 51b serving as the second light source develops colors by being projected on the nonfluorescent region 412, while excitation light output from the laser light source 51v serving as the first light source develops a different color from the visible light by fluorescence by being projected on the fluorescent region 411A, thereby displaying an image on the first screen 41A. More specifically, the red color R and the blue color B are developed by the laser light beams RR and BB in the nonfluorescent region 412, while the green color G by fluorescence is developed in the fluorescent region 411A by the excitation light VV, thereby displaying a full color image on the first screen 41A.

As the above, the visible light output from the laser light sources 51r and 51b that are the second light source develop colors by being projected in the nonfluorescent region 412, improving use efficiency while suppressing attenuation of the visible light. Therefore, even when light having relatively low luminescence intensity is used as the laser light sources 51r and 51b, enabling display of an image superior in image contrast and brightness. That is, a high grade image can be displayed while a cost of the laser light source 51r and 51b is reduced.

Here, the details on the first screen 41A will be described.

As shown in FIG. 11, the first screen 41A includes the large number of the fluorescent regions 411A formed at intervals from each other on an input side of the laser light beam L1 with respect to a screen body 413. Such a region between the fluorescent regions 411A forms the nonfluorescent region 412.

Then, on the input side of the laser light beam L1 on the screen body 413, a light transmissive layer 414, the fluorescence wavelength band reflector (fluorescence reflecting layer) 415, the light transmissive layer 416, and the microlens array 417 are sequentially layered in this order. On the other hand, on an output side of the laser light beam L1 on the screen body 413, the excitation light wavelength band reflector (excitation light reflecting layer) 418 is formed.

As shown in FIG. 10, each of the fluorescent regions 411A has a dot-like shape (circular shape) in a plan view. The large number of fluorescent regions 411A are aligned in a lattice (a square lattice) at intervals from each other.

The planar shape of each of the fluorescent regions 411A is not limited to the one described above, and the examples may include a polygonal shape such as a triangular shape and a quadrangular shape, and an oval shape.

The fluorescent region 411A formed with the large number of dot-like shaped portions dispersed as described above can be relatively easily formed by various film forming methods. In particular, an inkjet method is favorably employed to form the large number of fluorescent regions 411A as above. In a case of employing an inkjet method to form the fluorescent regions 411A, the fluorescent material such as the ones described above is dissolved in a solvent, or dispersed in a dispersion medium to be used. Alternatively, lyophobic treatment can be performed on a surface of the screen body 413 except for a portion where the large number of fluorescent regions 411A is to be formed and a liquid as the one described above can be applied thereto with various coating methods, thereby forming the large number of fluorescent regions 411A.

Further, since the large number of fluorescent regions 411A is regularly aligned in a plan view, even when a diameter of each of the fluorescent regions 411A is relatively large, color development by visible light and color development by fluorescence are made even so as to display a high grade image. The alignment of the large number of fluorescent regions 411A in a plan view is not limited to the one described above, and may be in a hound's-tooth check-like pattern, or in a random pattern, for example.

In the second embodiment, the diameter of each of the large number of florescent regions 411A is smaller than a spot diameter of the laser light beam L1 on the screen 41. Further, the large number of fluorescent regions 411A is arranged so that about six of them are included in a spot (that is, in a pixel) of the laser light beam (visible light and excitation light) on the screen 41.

Since the diameter of each of the fluorescent regions 411A is smaller than the spot diameter of the laser light beam L1 on the screen 41 as described above, even if the visible light and the excitation light are combined and irradiated in a same region on the screen 41, the excitation light is irradiated in the fluorescent regions 411A, while the visible light is irradiated in the nonfluorescent region 412.

In particular, the fluorescent regions 411A are arranged so that two or more of them are included in the spot of the laser light beam L1 on the screen 41. Therefore, even if an irradiation position of the visible light and the excitation light on the screen 41 is not highly accurate, a high grade image can be displayed.

The light transmissive layer 414 is formed so as to fill in a gap between the fluorescent regions 411A described above, and also to cover each of the fluorescent regions 411A. The light transmissive layer 414 as above is made of glass, or resin, for example, and configured to transmit light of each of the wavelengths for red, blue, green, and blue-violet colors. Then, a portion that is the gap between the fluorescent regions 411A in the light transmissive layer 414 forms the nonfluorescent region 412 substantially not including the fluorescent materials described above.

Further, the light transmissive layer 414 can also serve as a spacer to keep a distance between each of the fluorescent regions 411A, the fluorescence wavelength band reflector 415, and the microlens array 417 to be described later optimum.

Alternatively, the light transmissive layer 414 can be omitted. In this case, a void can be formed between the fluorescent regions 411A, or the fluorescence wavelength band reflector 415 can be closely attached to the screen body 413 at the gap between the fluorescent regions 411A.

In the second embodiment, the light transmissive layer 416 is formed to fill in the gap between the microlens array 417 to be described later and the fluorescence wavelength band reflector 415, and has a function to support the microlens array 417.

Further, the light transmissive layer 416 can also serve as a spacer to keep a distance between each of the fluorescent regions 411A and the microlens array 417 to be described later optimum.

Alternatively, the light transmissive layer 416 can be omitted.

The microlens array 417 includes a large number of micro lenses 417a that is aligned in a lattice so as to correspond to each of the fluorescent regions 411A in a plan view as shown in FIG. 10. In the second embodiment, each of the micro lenses 417a is arranged so that a center thereof corresponds with a center of corresponded one of the fluorescent regions 411A in a plan view.

Each of the micro lenses 417a as above collect the excitation light to each of the fluorescent regions 411a corresponded. This can improve use efficiency of the excitation light, and insufficient color development by the fluorescence is easily and securely prevented, thereby displaying a high grade image.

The microlens array 417 formed as described above includes the reflection excitation light reflector 419 formed on an opposite surface from the light transmissive layer 416 (the input side of the laser light beam L1). Because of a positional relationship between the microlens array 417 and the reflection excitation light reflector 419, reflected light reflected at the reflection excitation light reflector 419 is prevented from reaching to an undesired pixel, improving the use efficiency of the excitation light while achieving an excellent color balance of an image to be displayed.

According to the image display device in the second embodiment as described above, the visible light output from the laser light sources 51r and 51b serving as the second light source develops colors by being projected in the nonfluorescent region 412, improving use efficiency while suppressing attenuation of the visible light. Therefore, even when light having relatively low luminescence intensity is used as the laser light sources 51r and 51b, enabling display of an image superior in image contrast and brightness. That is, a high grade image can be displayed while a cost of the laser light sources 51r and 51b is reduced (consequently, cost reduction of the image display device 30).

The image display device according to the invention has been described based on the illustrated embodiments as above, however, it is not intended to limit the invention. For example, the image display device according to the invention may include any substitute that has the same function as its original configuration and may include any additional configurations.

Further, the image display device according to the invention may also be formed by combining arbitrary two or more configurations (features) of the above-mentioned embodiments.

In the second embodiment described above, the large number of dot-like fluorescent regions are formed so as to be dispersed, and the nonfluorescent region is formed to fill in the gap between the fluorescent regions. However, a large number of dot-like nonfluorescent regions may be formed so as to be dispersed, and a fluorescent region may be formed to fill in a gap between the nonfluorescent regions.

Further, in the embodiments described above, a case where red and blue colors are developed by colors of light from light sources, while green is developed by fluorescence so as to display a full color image has been described. However, it is not limited to this, and the invention is applicable to other cases as long as two colors among red, green, and blue are developed by colors of light from light sources while a color other than the two colors among red, green, and blue is developed by fluorescence.

Furthermore, when a full color image is displayed, only three colors, which are red, blue, and green are used in the embodiments. However, in addition to these colors, other colors such as cyan can be used, displaying a color image with a wider color gamut.

In addition, the image display device that can display a full color image has been described in the embodiments above, however, the invention is applicable to an image display device that can display an image with at least two colors.

In the embodiments, a case where the image display device according to the invention is installed in the slot machine is exemplified to explain. However, the image display device of the invention is possibly installed into game machines such as pachinko machines (Japanese pinball machines) other than slot machines, for example.

The image display device according to the invention is possibly used alone as a display. In particular, the image display has a characteristic that is extremely favorable for a display device such as an advertising sign.

What is claimed is:

1. An image display device, comprising:
    a screen having a fluorescent region including a fluorescent material;
    a light irradiation system, including:
        a first light source outputting excitation light exciting the fluorescent material;
        a second light source outputting visible light; and
        a scanning unit scanning with a light beam output from each of the first light source and the second light source on the screen; and
    an excitation light wavelength band reflector reflecting light in a wavelength band of the excitation light toward the screen, and formed on an output side of a light beam from the light irradiation system with respect to the screen,
    wherein the visible light output from the second light source diffuses by the screen, the excitation light output from the first light source develops a color different from that of the visible light by being projected in the fluorescent region.

2. The image display device according to claim 1, wherein the screen includes a display region to display the image and the fluorescent region is formed evenly through a nearly whole area of the display region.

3. The image display device according to claim 1, wherein the excitation light wavelength band reflector has a function to prevent the excitation light from transmitting through the screen and leaking outside.

4. The image display device according to claim 1, wherein the excitation light wavelength band reflector is formed with an optical multilayer thin film.

5. The image display device according to claim 1, wherein the light irradiation system is configured so that the second light source includes two light sources for outputting light beams in two colors among red, green, and blue, while the fluorescent region is formed so as to develop a color other than the two colors among red, green and blue by irradiation of the excitation light from the first light source.

6. The image display device according to claim 5, wherein the light irradiation system is configured so that the second light source includes two light sources in which one light source outputs a color light beam in red while the other light source outputs a color light beam in blue, and the fluorescent region develops a green color by irradiation of the excitation light from the first light source.

7. The image display device according to claim 1, wherein the light irradiation system is formed so that the excitation light output from the first light source and the visible light output from the second light source are combined so as to be irradiated to a same region on the screen at a same time.

8. The image display device according to claim 1, further comprising a reflection excitation light reflector formed on an input side of the light beam from the light irradiation system with respect to the screen, and reflecting reflected light of the excitation light reflected at the excitation light wavelength band reflector toward the screen.

9. The image display device according to claim 8, wherein the reflection excitation light reflector is formed with a polarizer.

10. The image display device according to claim 1, further comprising a fluorescence wavelength band reflector formed on an input side of the light beam from the light irradiation system with respect to the screen, allowing each of the visible light and the excitation light to transmit, and having a function to reflect light in one of a whole range and a part of a wavelength of fluorescence generated from the fluorescent region.

11. The image display device according to claim 10, wherein the fluorescence wavelength band reflector is formed with an optical multilayer thin film.

12. The image display device according to claim 1, wherein the first light source is a laser light source.

13. The image display device according to claim 1, wherein the screen has a portion forming a three-dimensional concave-convex pattern.

14. The image display device according to claim 13, wherein the screen is movable back and forth.

15. The image display device according to claim 13, wherein the three-dimensional concave-convex pattern is formed to be dynamically changeable.

* * * * *